(12) United States Patent
Deng et al.

(10) Patent No.: US 7,826,495 B2
(45) Date of Patent: Nov. 2, 2010

(54) METHOD, ETHERNET DEVICE AND ETHERNET FOR CLOCK SYNCHRONIZATION

(75) Inventors: Chaojun Deng, Shenzhen (CN); Jinhua Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 12/046,278

(22) Filed: Mar. 11, 2008

(65) Prior Publication Data

US 2008/0159330 A1  Jul. 3, 2008

Related U.S. Application Data

(63) Continuation of application No. PCT/CN2006/002295, filed on Sep. 6, 2006.

(30) Foreign Application Priority Data

Sep. 13, 2005  (CN)  .................. 2005 1 0102697

(51) Int. Cl.
*H04J 3/06* (2006.01)
*H04L 12/56* (2006.01)

(52) U.S. Cl. .................. 370/516; 370/358; 370/395.62; 709/248

(58) Field of Classification Search ......... 370/358–518; 709/248, 251; 375/354
See application file for complete search history.

(56) References Cited

U.S. PATENT DOCUMENTS

| 5,347,512 | A  | * | 9/1994  | Fechalos et al. | 370/384 |
| 6,128,292 | A  | * | 10/2000 | Kim et al.      | 370/356 |
| 7,126,937 | B2 | * | 10/2006 | Crosbie et al.  | 370/350 |
| 7,200,158 | B2 |   | 4/2007  | Gustin          |         |

| 7,613,212 | B1 | * | 11/2009 | Raz et al. | 370/510 |

(Continued)

FOREIGN PATENT DOCUMENTS

CN  1536849 A  10/2004

(Continued)

OTHER PUBLICATIONS

Kihara, "Performance Aspects of Reference Clock Distribution for Evolving Digital Networks," *IEEE Communications Magazine*, 27(4): 24-34 (Apr. 1989).

(Continued)

*Primary Examiner*—Afsar M. Qureshi
(74) *Attorney, Agent, or Firm*—Leydig, Voit & Mayer, Ltd.

(57) ABSTRACT

The present invention discloses a method and Ethernet device for clock synchronization, a method for clock synchronization in an entire Ethernet, and the relevant Ethernet. The method for clock synchronization in an Ethernet device includes: the PHY layer unit of the Ethernet device extracts a clock from the data sent by the receive unit; the MAC layer unit makes adjustments to the extracted clock according to the local clock and takes the adjusted clock as the transmit clock of the Ethernet device. The method for clock synchronization in an entire Ethernet includes: clocks of all Ethernet devices are synchronized to the clock generated by the Ethernet device at the highest level. The invention provides a method for clock synchronization so that sending and receiving of clocks in Ethernet devices can be synchronized and clock synchronization can be realized in the entire Ethernet.

18 Claims, 2 Drawing Sheets

U.S. PATENT DOCUMENTS

| | | | |
|---|---|---|---|
| 2002/0114303 A1 | 8/2002 | Crosbie et al. | |
| 2002/0136232 A1 | 9/2002 | Dudziak et al. | |
| 2003/0140173 A1* | 7/2003 | Bione | 709/251 |
| 2003/0169774 A1* | 9/2003 | Del Prado Pavon et al. | 370/503 |
| 2003/0235216 A1 | 12/2003 | Gustin | |
| 2004/0008661 A1 | 1/2004 | Myles et al. | |
| 2006/0072694 A1* | 4/2006 | Dai et al. | 375/354 |
| 2008/0101402 A1* | 5/2008 | Feng et al. | 370/463 |

FOREIGN PATENT DOCUMENTS

| | | |
|---|---|---|
| CN | 1722654 A | 1/2006 |
| WO | WO 2004/002031 A1 | 12/2003 |

OTHER PUBLICATIONS

PCT Written Opinion of the International Searching Authority (Jan. 4, 2007).

State Intellectual Property Office of the People's Republic of China, Examination Report in Chinese Patent Application No. 200510102697.4 (Oct. 30, 2009).

European Office Action (Mar. 4, 2010).

* cited by examiner

METHOD, ETHERNET DEVICE AND ETHERNET FOR CLOCK SYNCHRONIZATION

CROSS-REFERENCE TO RELATED APPLICATIONS

This application is a continuation of International Patent Application No. PCT/CN2006/002295, filed Sep. 6, 2006, which claims priority to Chinese Patent Application No. 200510102697.4, filed Sep. 13, 2005, both of which are hereby incorporated by reference.

FIELD OF THE INVENTION

The present invention relates to the network communication field, and in particular, to a method and Ethernet device for clock synchronization, a method for clock synchronization in an entire Ethernet, and the relevant Ethernet.

BACKGROUND OF THE INVENTION

Ethernet is a protocol in the lower layer of the network and operates on the physical (PHY) layer and data link layer in an open system interconnection (OSI) model.

Ethernet is suitable for building a local area network (LAN) because of its simple configuration, flexible networking, low cost, and popularity among people. Developing rapidly, Ethernet is used as a bearer network in metropolitan area networks (MANs) and even in wide area networks (WANs) and Ethernet technology is becoming a mainstream technology in transport networks.

Synchronization is the basis for the digitization of communication networks. Errors and slips in communication networks are inevitable in the absence of normal transmission of synchronous digital information. In a current transport network of Ethernet, information is transmitted asynchronously between nodes. As Ethernet becomes the mainstream technology in transport networks, clock synchronization and transmission need to be realized so that Ethernet can support and become compatible with the time division multiplexing (TDM) service of previous transport networks.

A method for clock transmission and synchronization in an Ethernet in the prior art is Ethernet pseudo wire emulation edge-to-edge (PWE3).

The basic principle of PWE3 is to set up a channel in a packet switched network to implement TDM circuits (T1 or E1) so that it does not matter for the TDM devices at either end of the network whether they are connected to a TDM network. The emulation of a TDM circuit in a packet switched network is known as circuit emulation.

In PWE3, either an external synchronization clock or an algorithm can be adapted to recover a TDM clock, to calculate the original clock rate based on the varying packet arrival rate. As defined in G.823 and G.824 of the International Telecommunication Union-Telecommunication Standardization Sector (ITU-T), however, TDM networks have strict requirements on clock stability and the packet arrival rates need to be filtered to lessen the impacts from packet delay variations.

The above method for clock synchronization and transmission is immature and therefore not applied widely because the clock recovery quality in the method is poor in case of heavy traffic.

Another method for clock synchronization and transmission in an Ethernet in the prior art is building integrated timing supply (BITS), in which the network clock is recovered by the global positioning system (GPS).

BITS is the core clock device in synchronization network construction. All devices synchronize their clocks to the precise clock provided by BITS so that precise synchronization of network clocks can be realized. BITS can obtain long-term timing signals of high precision from GPS satellite signals and output timing signals for the reference clock based on a position retaining mode algorithm and a high-quality local oscillator.

The above method is mainly applied in the synchronous digital hierarchy (SDH) of optical networks but not in the Ethernet for clock synchronization and transmission. Special BITS clock network is also needed for the method.

SUMMARY OF THE INVENTION

An embodiment of the present invention provides a method and Ethernet device for clock synchronization, a method for clock synchronization in an entire Ethernet, and the relevant Ethernet, so that the sending and receiving of clocks can be synchronized and that clock synchronization can be realized in the entire Ethernet.

An embodiment of the present invention provides a method for clock synchronization in an Ethernet device. The method includes:

A. by a PHY layer unit of an Ethernet device, extracting a clock from data sent by a receive unit; and B. by a MAC layer unit, adjusting the extracted clock according to local clock and taking the adjusted clock as transmit clock of the Ethernet device.

The present invention provides an Ethernet device, which includes:

a receive unit, adapted to receive data sent to the Ethernet device;

a PHY layer unit, adapted to receive data from the receive unit and extract the clock received by the receive unit from the data; and a MAC layer unit, adapted to adjust the extracted clock from the PHY layer unit according to local clock and take the adjusted clock as transmit clock of the Ethernet device.

An embodiment of the present invention provides a method for clock synchronization in an entire Ethernet, including:

synchronizing clocks of all Ethernet devices to the clock of the Ethernet device at the highest level based on the method for clock synchronization in an Ethernet device.

An embodiment of the present invention provides an Ethernet, including Ethernet devices at the upper neighboring level and the present level. The Ethernet devices at the present level synchronize their clocks to the clocks of the Ethernet devices at the upper neighboring level according to the data received.

The technical solution provided in the above embodiment of the invention has the following advantages:

1. The invention adopts line clock recovery on Ethernet interfaces for the synchronization of the sending and receiving of a clock, providing a simple, stable, and feasible solution for clock synchronization in Ethernet applications such as TDM over IP.
2. The invention adopts the master-slave synchronization mode in the Ethernet; that is, clocks of Ethernet devices at lower levels are all synchronized to the clock of the device at the highest level so that clock transmission and synchronization can be realized in the entire Ethernet.

DETAILED DESCRIPTION OF THE INVENTION

An embodiment of the present invention provides a method and Ethernet device for clock synchronization, a method for clock synchronization in an entire Ethernet, and the relevant Ethernet. The core of the invention is: the PHY layer unit of an Ethernet device extracts a clock from the data on the SERDES line by CDR. The extracted clock is then adjusted according to the local clock of the MAC layer and used as the transmit clock.

The invention is hereinafter described in detail with reference to the accompanying drawings. In an embodiment of the invention, an Ethernet device includes a receive unit, a PHY layer unit and a MAC layer unit.

The receive unit receives data sent to the Ethernet device. The PHY layer unit extracts a clock from the data sent by the receive unit. The MAC layer unit adjusts the extracted clock sent by the PHY layer unit according to the local clock and takes the adjusted clock as the transmit clock.

Figure 1:
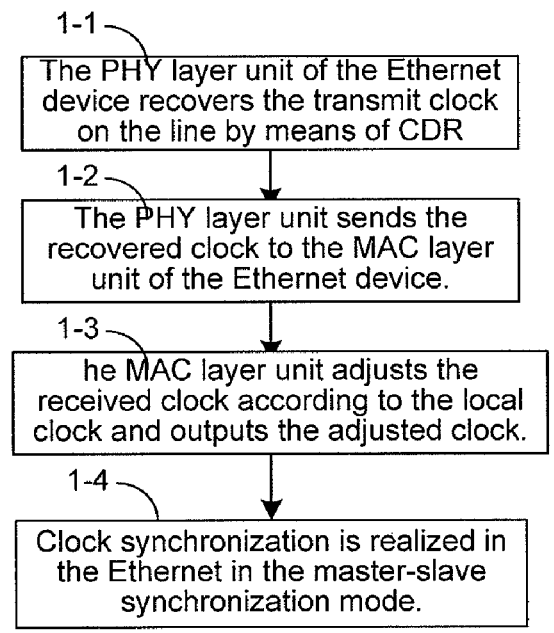
FIG. 1 shows the flow of clock synchronization in an Ethernet device in an embodiment of the invention.

FIG. 1 shows the flow of clock synchronization in an Ethernet device. The flow includes the following steps:

Step 1-1: The PHY layer unit of the Ethernet device recovers the transmit clock of the line by CDR.

Figure 2:
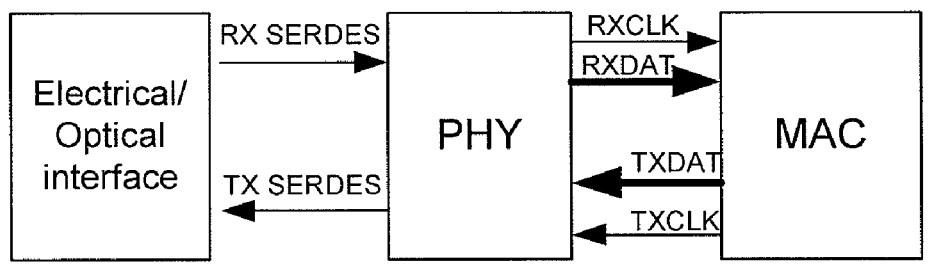
FIG. 2 shows the Ethernet device in an embodiment of the invention.

The Ethernet device includes an optical module, a PHY layer unit, and a MAC layer unit. The Ethernet device herein may also refer to an Ethernet interface in a common Ethernet device. The optical module includes an electrical/optical interface. FIG. 2 shows the structure of an Ethernet device.

In FIG. 2, the electrical/optical interface at the receive end of the Ethernet connects to the PHY layer by a SERDES line. The electrical/optical interface sends the received clock signals to the PHY layer unit through the SERDES line. The PHY layer unit recovers the clock of the SERDES line by CDR, that is, the receive clock of the electrical/optical interface.

Figure 3:
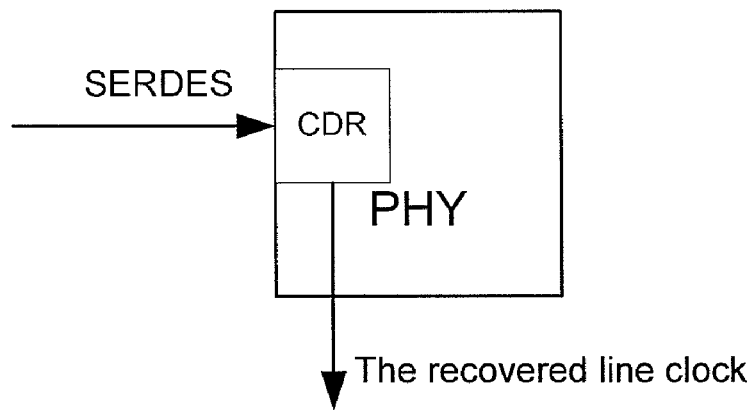
FIG. 3 shows the recovery of the clocks of SERDES lines by the PHY layer unit in an Ethernet device by means of clock and data recovery (CDR)

FIG. 3 shows the recovery of the clock of the SERDES line by the PHY layer unit by CDR. In the CDR, any known technology, such as phase insertion and over sampling, may be adapted to recover the data and clock in a phase-locked loop based on the transient 0 and 1 in a serial data stream.

Step 1-2: The PHY layer unit sends the recovered clock to the MAC layer unit of the Ethernet device.

After recovering the clock of the SERDES line by CDR, the PHY layer unit sends the recovered clock to the MAC layer unit of the Ethernet device.

Signals transmitted between the PHY layer unit and the MAC unit include clocks, data, and control signals. The PHY layer unit sends the received data and recovered clock to the MAC layer unit for processing.

Figure 4:
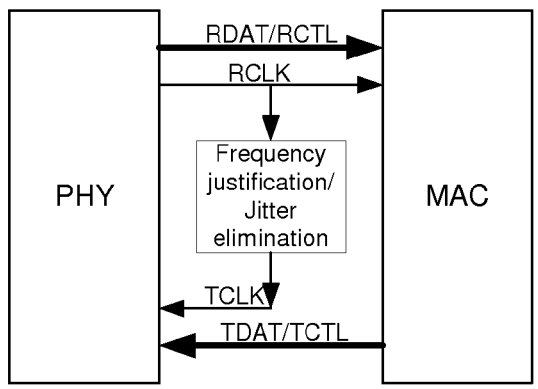
FIG. 4 shows the adjustment of a clock in the MAC layer of an Ethernet device.

Step 1-3: The MAC layer unit adjusts the received clock according to the local clock and outputs the adjusted clock. FIG. 4 shows the adjustment of a clock in the MAC layer of an Ethernet device.

The clock at the interface of the MAC layer is the local clock of the MAC layer. The MAC layer unit makes adjustment, such as frequency justification and jitter elimination, and if necessary, phase adjustment, to the extracted clock from the PHY layer unit. The adjusted clock is sent to the transmit unit as the transmit clock and thus the clock synchronization of the receive unit and the transmit unit is realized in an Ethernet device.

After the clocks of the receive unit and the transmit unit are synchronized in an Ethernet device, an embodiment of the invention may adopt the master-slave synchronization mode to realize clock synchronization in an entire Ethernet.

The Ethernet in an embodiment of the invention includes multilevel Ethernet devices. An Ethernet device at the present level synchronizes its local clock to the clock in the data from the Ethernet device at the upper neighboring level. The Ethernet device at the lower neighboring level synchronizes its local clock to the clock in the data from the Ethernet device at the present level. In this way, clocks of all Ethernet devices at lower neighboring levels are synchronized to the clock of the Ethernet device at the highest level.

Figure 5:
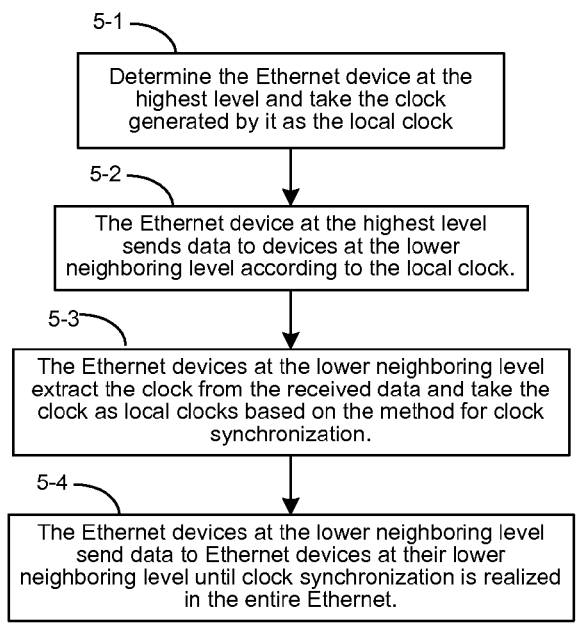
FIG. 5 shows the flow of clock synchronization in an entire Ethernet in an embodiment of the invention.

FIG. 5 shows the flow of clock synchronization in an entire Ethernet. The flow includes the following steps:

Step 5-1: Determine the Ethernet device at the highest level in an Ethernet and take the clock generated by itself as the local clock.

Determine the Ethernet device at the highest level and take the clock generated by the device as the local clock, which is the reference clock in the entire Ethernet. Clocks of all Ethernet devices at lower levels need to be synchronized to the reference clock.

Figure 6:
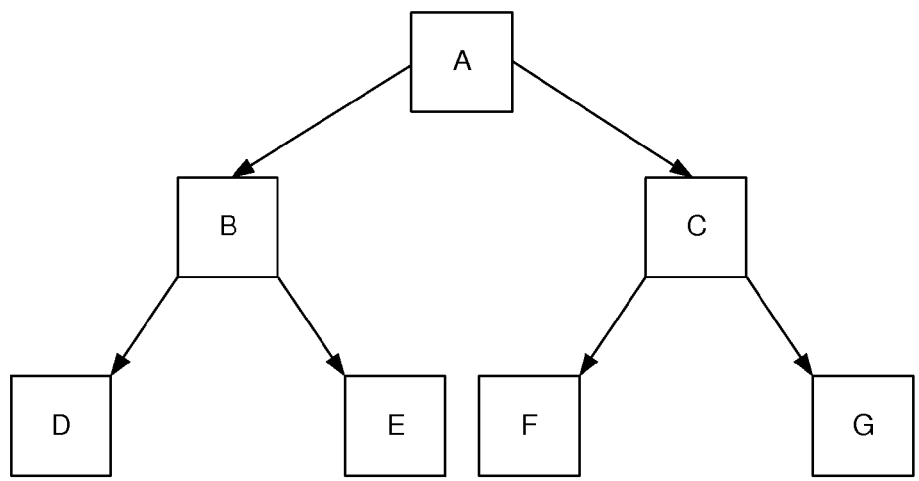
FIG. 6 shows an Ethernet networking in an embodiment of the invention.

FIG. 6 shows an Ethernet comprising Ethernet devices A, B, C, D, E, F, and G. A is at the highest level in the Ethernet, and located at the upper neighboring level of B and C. B is located at the upper neighboring level of D and E. C is located at the upper neighboring level of F and G. A takes the clock generated by itself as the local clock.

Step 5-2: The Ethernet device at the highest level sends data to Ethernet devices at the lower neighboring level according to the local clock.

To synchronize clocks of all devices in the Ethernet, the Ethernet device at the highest level sends data to all Ethernet devices at the lower neighboring level according to the local clock.

In the Ethernet networking in FIG. 6, A sends data to B and C according to its local clock.

Step 5-3: The Ethernet devices at the lower neighboring level extract the clock from the data received from the Ethernet device at the highest level and take the extracted clock as their clocks based on the method for clock synchronization.

The Ethernet devices at the lower neighboring level extract the clock from the data received from the Ethernet device at the highest level and take the extracted clock as their clocks based on the method for clock synchronization.

In the Ethernet networking in FIGS. 6, B and C extract the clock of A from the data received and take the extracted clock as their clocks.

Step 5-4: The Ethernet devices at the lower neighboring level send data to Ethernet devices at their upper neighboring level and lower neighboring level until clocks of all devices are synchronized.

The Ethernet devices at the lower level send data to Ethernet devices at their upper level and lower level according to the extracted clock. The Ethernet devices at the lower level that receive the data extract the clock and take it as their clocks based on the method for clock synchronization in an Ethernet device, and then send data to Ethernet devices at their upper level and lower level according to the local clocks. The procedure goes on until clocks of all Ethernet devices are synchronized.

In the Ethernet networking in FIG. 6, B sends data to A, D, and E according to its local clock. D and E extract the transmit clock of B from the received data, which may be understood as the clock of A, and send data to B according to the extracted clock. C sends data to F and G according to its local clock. F and G extract the transmit clock of C from the data sent by C and send data to C according to the extracted clock.

In the Ethernet networking in FIG. 6, clock transmission and synchronization are fulfilled. Clock synchronization in the entire Ethernet is realized after clocks of A, B, C, D, E, F, and G are all synchronized to the clock of A, the device at the highest level.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

The invention claimed is:

1. A method for synchronizing a clock of an Ethernet device, comprising:
   receiving, by an optical module of a first Ethernet device, data sent by a second Ethernet device;
   extracting, by a PHY layer unit of the first Ethernet device, a clock from the data;
   sending, by the PHY layer unit, the clock to a MAC layer unit of the first Ethernet device; and
   adjusting, by the MAC layer unit, the clock according to a local clock and taking the adjusted clock as a transmit clock of the first Ethernet device.

2. The method of claim 1, wherein the receiving, by the optical module, data from the second Ethernet device and the extracting, by the PHY layer unit, the clock from the data comprises:
   receiving, by an electrical/optical interface, the data sent by the second Ethernet device, wherein the optical module comprises the electrical/optical interface;
   sending, by the electrical/optical interface, the data to the PHY layer unit through a serial-to-parallel conversion (SERDES) line; and
   recovering, by the PHY layer unit, the clock of the SERDES line based on the transient 0 and 1 in a serial data stream by clock and data recovery (CDR).

3. A method for clock synchronization in an entire Ethernet, comprising:
   synchronizing, by a first Ethernet device, its local clock to the clock of a second Ethernet device at an upper neighboring level according to the method of claim 2;
   synchronizing, by a third Ethernet device at a lower neighboring level, its local clock to the clock of the first Ethernet device according to the method of claim 2.

4. An Ethernet, comprising a first Ethernet device at a level and a second Ethernet device at an upper neighboring level,
   wherein the first Ethernet device synchronizes its clock to the clock of the second Ethernet device according to the method of claim 2.

5. The method of claim 1 wherein the sending the clock to a MAC layer unit of the first Ethernet device comprises:
   sending the clock extracted from the data to the MAC layer unit through an Ethernet interface.

6. The method of claim 5, wherein the adjusting the clock according to the local clock comprises:
   making, by the MAC layer unit, adjustment to the clock, wherein the adjustment is frequency justification or jitter elimination.

7. The method of claim 6, wherein the adjusting the clock according to the local clock further comprises:
   adjusting a phase of the clock received from the PHY layer unit.

8. A method for clock synchronization in an entire Ethernet, comprising:
   synchronizing, by a first Ethernet device, its local clock to the clock of a second Ethernet device at an upper neighboring level according to the method of claim 1;
   synchronizing, by a third Ethernet device at a lower neighboring level, its local clock to the clock of the first Ethernet device according to the method of claim 1.

9. The method of claim 8, further comprising:
   determining a fourth Ethernet device at the highest level, which takes the clock generated by itself as its local clock; and
   sending data, by the fourth Ethernet device, to an Ethernet device at a lower neighboring level of the fourth Ethernet device.

10. An Ethernet device, comprising:
    a receive unit, adapted to receive data sent to the Ethernet device from a second Ethernet device;
    a PHY layer unit, adapted to receive data from the receive unit, extract a clock from the data and send the clock to a MAC layer unit; and
    the MAC layer unit, adapted to adjust the clock received from the PHY layer unit according to a local clock and take the adjusted clock as a transmit clock of the Ethernet device.

11. The Ethernet device of claim 10, wherein:
    the receive unit sends data to the PHY layer unit through a serial-to-parallel conversion (SERDES) line; and
    the PHY layer unit extracts the clock of the SERDES line based on the transient 0 and 1 in a serial data stream by clock and data recovery (CDR).

12. The Ethernet device of claim 10, wherein:
    the PHY layer unit sends the clock extracted from the data to the MAC layer unit through an Ethernet interface.

13. The Ethernet device of claim 12, wherein:
    the MAC layer unit makes an adjustment to clock received from the PHY layer unit, the adjustment including frequency justification or jitter elimination.

14. The Ethernet device of claim 13, wherein:
    the MAC layer unit further adjusts a phase of the clock received from the PHY layer unit.

15. An Ethernet, comprising a first Ethernet device at a level and a second Ethernet device at an upper neighboring level, wherein:
    the first Ethernet device synchronizes its clock to the clock of the second Ethernet device according to the method of claim 1.

16. The Ethernet of claim 15, further comprising a third Ethernet device; wherein:

the third Ethernet device at the lower neighboring level synchronizes its clock to the clock of the first Ethernet device according to the method of claim 1.

17. The Ethernet of claim 16, wherein the second Ethernet device takes a clock generated by itself as its clock if the second Ethernet device is located at the highest level.

18. The Ethernet of claim 15, wherein the first Ethernet device comprises:

a receive unit, adapted to receive data sent to the first Ethernet device from the second Ethernet device;

a PHY layer unit, adapted to receive data from the receive unit, extract a clock from the data and send the clock to a MAC layer unit; and the MAC layer unit, adapted to adjust the clock received from the PHY layer unit according to a local clock and take the adjusted clock as a transmit clock of the first Ethernet device.

* * * * *